United States Patent
Bouzid et al.

(10) Patent No.: US 12,173,126 B2
(45) Date of Patent: Dec. 24, 2024

(54) CONTROLLING THE RHEOLOGY OF A METAL ORE RESIDUE

(71) Applicant: COATEX, Genay (FR)

(72) Inventors: Mehdi Bouzid, Sainte Foy les Lyon (FR); Christian Jacquemet, Lyons (FR); Benoit Magny, Cailloux sur Fontaines (FR); Jacques Mongoin, Quincieux (FR)

(73) Assignee: COATEX, Genay (FR)

( * ) Notice: Subject to any disclaimer, the term of this patent is extended or adjusted under 35 U.S.C. 154(b) by 844 days.

(21) Appl. No.: 15/734,381

(22) PCT Filed: Jun. 5, 2019

(86) PCT No.: PCT/FR2019/000093
§ 371 (c)(1),
(2) Date: Dec. 2, 2020

(87) PCT Pub. No.: WO2019/234316
PCT Pub. Date: Dec. 12, 2019

(65) Prior Publication Data
US 2021/0171722 A1    Jun. 10, 2021

(30) Foreign Application Priority Data
Jun. 8, 2018  (FR) ..................... 18 54993

(51) Int. Cl.
| | | |
|---|---|---|
| C22B 3/40 | (2006.01) | |
| C08F 2/22 | (2006.01) | |
| C08F 220/06 | (2006.01) | |
| C08F 220/18 | (2006.01) | |
| C08J 3/05 | (2006.01) | |
| C22B 3/26 | (2006.01) | |
| C22B 15/00 | (2006.01) | |

(52) U.S. Cl.
CPC ..................... *C08J 3/05* (2013.01); *C08F 2/22* (2013.01); *C08F 220/06* (2013.01); *C08F 220/1802* (2020.02); *C22B 3/41* (2021.05); *C22B 15/00* (2013.01)

(58) Field of Classification Search
CPC ... C08J 3/05; C08F 2/22; C08F 220/06; C08F 220/1802; C22B 3/41; C22B 15/00; B01D 21/01; C02F 2103/10; C02F 1/56
See application file for complete search history.

(56) References Cited

U.S. PATENT DOCUMENTS

| | | |
|---|---|---|
| 6,231,768 B1 | 5/2001 | Barham et al. |
| 6,365,116 B1 | 4/2002 | Barham et al. |
| 2011/0155671 A1 | 6/2011 | Moody et al. |
| 2012/0145644 A1* | 6/2012 | Moody .......... B01D 21/01 210/721 |
| 2018/0362371 A1 | 12/2018 | Favero et al. |

FOREIGN PATENT DOCUMENTS

| | | |
|---|---|---|
| GB | 1 414 964 | 11/1975 |
| WO | WO 00/43317 A1 | 7/2000 |
| WO | WO 2007/082797 A1 | 7/2007 |
| WO | WO 2017/097799 A1 | 6/2017 |

OTHER PUBLICATIONS

International Search Report issued on Oct. 2, 2019 in PCT/FR2019/000093 filed on Jun. 5, 2019, 2 pages.

* cited by examiner

*Primary Examiner* — Anthony M Liang
*Assistant Examiner* — Danny N Kang
(74) *Attorney, Agent, or Firm* — Oblon, McClelland, Maier & Neustadt, L.L.P.

(57) ABSTRACT

A method can prepare an aqueous mineral suspension from an aqueous metal ore residue into which there is introduced a polymer (P) having a molecular weight Mw measured by GPC of from 100,000 to 3.106 g/mol and prepared by free radical polymerization of at least one anionic monomer (m). The suspension produced may have a Brookfield viscosity greater than 2,000 mPa·s and/or a flow threshold of greater than 40 Pa.

20 Claims, No Drawings

CONTROLLING THE RHEOLOGY OF A METAL ORE RESIDUE

CROSS-REFERENCE TO RELATED APPLICATIONS

The present application is the national stage of international application PCT/FR2019/000093, filed on Jun. 5, 2019, and claims the benefit of the filing date of French Appl. No. 18 54993, filed on Jun. 8, 2018.

The invention relates to a method for preparing an aqueous mineral suspension from an aqueous metal ore residue into which is introduced a polymer (P) with a molecular mass Mw, measured by GPC, ranging from 100,000 to $3.10^6$ g/mol and prepared by radical polymerisation of at least one anionic monomer (M). The invention also relates to the suspension produced whose Brookfield viscosity is greater than 2,000 mPa·s or whose flow threshold is greater than 40 Pa.

The method according to the invention is used in a mining process involving at least one mineral deposit. These mining methods generally make it possible to obtain at least one useable metal from a metal ore. The metal ore also comprises a residue of this metal ore. The mining methods are usually implemented using water as a medium for processing or conveying the dry solids content. Therefore, the metal ore residue is usually an aqueous metal ore residue. It can also be a sludge of metal ore residue. It can also be a muddy residue of ore.

According to the invention, the aqueous metal ore residue thus results from at least one step in which the useable metal or a derivative of the useable metal is separated from a metal ore, in particular a metal ore produced by mining extraction.

According to the invention, the fraction of the useable metal ore is a metal or several metals or a derivative of a metal or a derivative of several metals.

When using the method of preparation according to the invention, an essential step consists of adding at least one polymer (P) to an aqueous metal ore residue. This step therefore relates to the processing of a metal ore residue. It does not relate to the processing of the useable metal ore. This step is therefore generally used in a mining method comprising various steps for processing the metal ore and various steps for processing the metal ore residue.

Typically, mining methods comprise several steps for processing the metal ore, several steps for processing the useable metal or for processing the derivative of the useable metal, as well as several steps for processing the metal ore residue.

A mining method typically comprises one or more of the following steps:
- crushing the metal ore,
- grinding the metal ore, in particular dry grinding or wet grinding, usually in water,
- separating, in particular by flotation, the useable metal or a derivative of the useable metal and the metal ore residue, particularly the aqueous residue,
- purifying or enriching the useable metal or a derivative of the useable metal, in particular by flotation,
- concentrating the metal ore residue, for example by filtration, by settling, by gravitation, by using a thickener, by flocculation,
- partially separating the aqueous metal ore residue and part of the water,
- conveying the aqueous metal ore residue,
- storing the aqueous metal ore residue.

There are known methods for preparing an aqueous mineral suspension from an aqueous metal ore residue, particularly the methods used to process, convey or store such a residue.

Document EP 1976613 relates to the concentration of an aqueous suspension of solid particles by adding an organic flocculant polymer and an agent chosen in the group comprising radical agents, oxidising agents, enzymes and radiation.

Document WO 00-43317 discloses the use of a viscosity-modifying compound in a sludge thickener during which this compound is incorporated into a thickener in a specific way.

Document WO 2017-097799 discloses a method for processing an aqueous effluent resulting from oil sands mining operations that comprises the addition of a sulphonated dispersing agent and then the addition of a flocculating agent.

Document GB 1414964 relates to a method for deflocculating a particulate material that consists of adding a copolymer or a water-soluble derivative of a vinyl copolymer to a grout of the particulate material.

To facilitate their handling, the known suspensions typically have a lower solids content. In fact, adding water may help to lower the viscosity or the flow threshold of these suspensions.

However, adding water leads to problems with water consumption, energy consumption or even problems with organising and storing the aqueous metal ore residues.

It is therefore important to have methods for preparing an aqueous mineral suspension from an aqueous metal ore residue having a high dry solids content.

It is also important to have such methods that make it possible to prepare stable suspensions, in particular at high dry solids contents. Likewise, it is important to have such methods which make it possible to prepare suspensions that are stable and in which the particles of dry solids content have a particle size distribution that is relatively coarse or is not very uniform.

It is important to be able to control the viscosity of aqueous mineral suspensions prepared from a mining derivative, in particular to make it easier to pump, stir or convey them. Controlling the viscosity of aqueous mineral suspensions prepared from a mining derivative is therefore essential, especially for their storage. In fact, the conditions for storing sludges or aqueous mineral suspensions prepared from a mining derivative can be influenced by many factors, both physical and chemical.

Therefore, concentration, rheological behaviour and in particular viscosity, flow threshold, slope angle, must be controllable.

If these parameters are not sufficiently controlled, storage in ponds may be disrupted and these ponds may present uncontrolled flow hazards. It is therefore necessary to be able to thicken aqueous ore residues, in particular at a thickener outlet, while controlling their rheology. These residues can then be stored more efficiently and safely in ponds, in particular by stacking up successive layers of thickened residue. Stacking residue up in successive layers with an appropriate slope makes it possible to increase the useful life of the storage ponds which usually have limited surface areas.

Moreover, compatibility with the various constituents of aqueous mineral suspensions prepared from an aqueous metal ore residue is also an important property to look for, in particular compatibility with a flocculation agent that can be used to process the aqueous metal ore residue, in particular compatibility with a polyacrylamide or a polyacrylamide derivative.

It is also important to be able to control the behaviour of the aqueous mineral suspensions prepared from an aqueous metal ore residue in order to avoid problems with the processing, storage or conveying equipment. Indeed, this equipment can be damaged, jammed or clogged if there is a drift in or lack of control of the viscosity or of the flow threshold of a mineral suspension prepared from an aqueous metal ore residue.

It is also important to have methods for controlling the viscosity of the aqueous mineral suspensions in which this control is achieved by action on the aqueous phase without significantly altering or disturbing the flocculation of the mineral particles.

There is therefore a need for improved methods for preparing an aqueous mineral suspension from an aqueous metal ore residue.

The method according to the invention provides a solution to all or part of the problems with the methods used in the prior art to prepare an aqueous mineral suspension from an aqueous metal ore residue.

Thus, the invention provides a method for preparing an aqueous mineral suspension with a dry solids content that is greater than 40% by weight of the suspension and having at least one property chosen among:
 a Brookfield viscosity, measured at 100 rpm and at 25° C., greater than 2,000 mPa·s;
 a flow threshold measured at a temperature of 25° C. using a rheometer with imposed shearing, equipped with a bladed spindle, for a particular torsional loading, greater than 40 Pa; and
 a Brookfield viscosity, measured at 100 rpm and at 25° C., greater than 2,000 mPa·s and a flow threshold, measured at a temperature of 25° C. using a rheometer with imposed shearing, equipped with a bladed spindle, for a particular torsional loading, greater than 40 Pa;
 comprising the addition, in an aqueous metal ore residue, of at least one polymer (P) with a molecular mass Mw, measured by GPC, ranging from 100,000 to $3.10^6$ g/mol and prepared by at least one radical polymerisation reaction at a temperature greater than 50° C., and chosen among:
 a polymer (P1) prepared in direct emulsion from:
  (a) at least one anionic monomer comprising at least one polymerisable olefinic unsaturation and at least one carboxylic acid group;
  (b) at least one ester of an acid chosen among acrylic acid, methacrylic acid;
 in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof;
 a polymer (P2) prepared in reverse emulsion from:
  (a) at least one anionic monomer comprising at least one polymerisable olefinic unsaturation and at least one carboxylic acid group or one of its salts;
  (c) at least one compound chosen among acrylamide, an acrylamide derivative, a salt of an acrylamide derivative and combinations thereof;
 in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof.

The method according to the invention therefore makes it possible to control the essential properties of the aqueous suspension prepared. This method makes it possible to control both the Brookfield viscosity and the flow threshold of the prepared suspension.

According to the invention, the Brookfield viscosity is measured at 100 rpm and at 25° C., for example using a Brookfield DV3T rheometer. The Brookfield viscosity of the prepared suspension is greater than 2,000 mPa·s. Preferably, the method according to the invention makes it possible to prepare a suspension that has a viscosity greater than 2,500 mPa·s, more preferentially greater than 3,000 mPa·s or greater than 4,000 mPa·s. Also preferably according to the invention, the viscosity of the prepared suspension is less than 10,000 mPa·s, more preferentially less than 8,000 mPa·s or less than 7,000 mPa·s. Also preferably according to the invention, the viscosity of the prepared suspension ranges from 1,800 mPa·s to 10,000, 8,000 or 7,000 mPa·s or from 2,000 mPa·s to 10,000, 8,000 or 7,000 mPa·s or from 2,500 mPa·s to 10,000, 8,000 or 7,000 mPa·s or even from 3,000 mPa·s to 10,000, 8,000 or 7,000 mPa·s or even from 4,000 mPa·s to 10 000, 8 000 or 7 000 mPa·s.

Particularly advantageously, the method according to the invention makes it possible to control, in particular to increase, the flow threshold of the aqueous metal ore residue relative to the flow threshold of the aqueous metal ore residue that does not comprise any polymer (P).

According to the invention, the flow threshold, which characterises the flow resistance, is measured on a sample of an aqueous mineral suspension, particularly of an aqueous metal ore residue. The flow threshold is the shearing that must be applied to a suspension to cause it to flow. If the shearing is insufficient, the suspension deforms elastically whereas if the shearing is sufficient, the suspension can flow like a liquid.

According to the invention, the flow threshold expressed in Pascals (Pa) is measured at a temperature of 25° C. using a Brookfield DV3T rheometer with imposed shearing, equipped with a suitable spindle with blades. Without destroying the underlying structure, the bladed spindle is immersed into the material up to the first immersion mark. After a five-minute wait time, the measure is taken without pre-shearing at a speed of 0.5 rpm. This relatively low speed is preferred so as to minimise the inertia effect of the bladed spindle. The variation in torsional loading measured by the instrument in order to maintain a spin speed of 0.5 rpm is tracked over time. The value of the flow limit or flow threshold of the aqueous residue is indicated by the instrument when this variation is zero.

According to the invention, the flow threshold is measured at a temperature of 25° C. using a rheometer with imposed shearing, equipped with a bladed spindle, for a particular torsional loading. The flow threshold of the prepared suspension is greater than 40 Pa.

Preferably, the method according to the invention makes it possible to prepare a suspension that has a flow threshold greater than 80 Pa or greater than 100 Pa, preferably greater than 150 Pa or greater than 200 Pa or greater than 300 Pa. Also preferably, the method according to the invention makes it possible to prepare a suspension that has a flow threshold of less than 700 Pa or less than 500 Pa, preferably less than 450 Pa or less than 400 Pa.

Also preferably, the method according to the invention makes it possible to prepare a suspension that has a flow threshold greater than 80 Pa or greater than 100 Pa, preferably greater than 150 Pa or greater than 200 Pa or greater than 300 Pa, and less than 700 Pa or less than 500 Pa, preferably less than 450 Pa or less than 400 Pa.

More particularly, the method according to the invention makes it possible to prepare a suspension that has a flow threshold ranging from 40 Pa to 700, 500, 450 or 400 Pa or from 80 Pa to 700, 500, 450 or 400 Pa or from 100 Pa to 700, 500, 450 or 400 Pa or from 150 Pa to 700, 500, 450 or 400 Pa or even from 200 Pa to 700, 500, 450 or 400 Pa or from 300 Pa to 700, 500, 450 or 400 Pa.

The method according to the invention makes it possible to control the rheology of the prepared suspension for a dry solids content greater than 40% by weight of the suspension. Preferably, the method according to the invention makes it possible to prepare a suspension having a dry solids content greater than 50% by weight or 55% by weight. More preferably, the method according to the invention makes it possible to prepare a suspension having a dry solids content greater than 60% by weight or greater than 65% by weight. Much more preferentially, the method according to the invention makes it possible to prepare a suspension having a dry solids content greater than 70% by weight or greater than 75% by weight.

According to the invention, the amount of polymer (P) used may vary quite widely. Preferably according to the invention, the prepared suspension comprises from 0.01 to 2% by weight or from 0.01 to 1.8% or from 0.01 to 1.5% of polymer (P) (dry/dry relative to the ore residue). More preferentially, the prepared suspension comprises from 0.01 to 1.2% or from 0.01 to 1% or from 0.02 to 0.8% or from 0.03 to 0.5% or from 0.04 to 0.25% or from 0.04 to 0.15% by weight of polymer (P) (dry/dry relative to the ore residue).

The method according to the invention may use one or more polymers (P). Preferably, the suspension prepared thus comprises one, two or three different polymers (P). The method according to the invention may also comprise the further addition of at least one compound chosen among a thickening polymer derivative of natural or synthetic, mineral or organic origin (alginates, guar gum, xanthan gum, modified cellulose derivatives, unmodified cellulose derivatives, starches, modified starches), of mineral origin (bentonite, laponite, clays), an unmodified polysaccharide and a polysaccharide.

The method according to the invention comprises the addition of at least one polymer (P) to an aqueous mineral ore residue. Preferably, the metal ore is not an aluminium ore. Also preferably according to the invention, the metal ore is chosen among lithium, strontium, lanthanide, actinide, uranium, rare earth, titanium, zirconium, vanadium, niobium, chromium, molybdenum, tungsten, manganese, iron, cobalt, rhodium, iridium, nickel, palladium, platinum, copper, silver, gold, zinc, cadmium, tin and lead ores. More preferably according to the invention, the metal ore is chosen among uranium, molybdenum, manganese, iron, cobalt, nickel, copper, silver and gold ores. Much more preferably, it is a copper ore. It can also be a derivative of several useable metals comprising copper, zinc and cobalt.

According to the invention, the metal ore comprises at least one useable metal or at least one useable metal derivative obtained by separating all or part of the residue from the metal ore. Preferably according to the invention, the metal ore comprises a metal oxide, a metal sulphide or a metal carbonate.

According to the invention, the metal ore residue may comprise a certain residual amount of metal. Particularly, the metal ore residue may comprise a residual amount of metal of less than 2,000 g per tonne (dry/dry) relative to the amount of metal ore residue. This amount of metal in the metal ore residue can typically range from 10 to 2,000 g per tonne (dry/dry) or from 10 to 1,000 g per tonne (dry/dry), relative to the amount of metal ore residue.

When using the method according to the invention, the polymer (P) can be added during one or several steps in the mining process, in particular during one or several of the metal ore residue processing steps such as pumping, flocculating, concentrating, conveying or storing the metal ore residue, particularly the aqueous metal ore residue.

According to the invention, during a step of concentration of the aqueous metal ore residue according to the invention, the concentration of the aqueous metal ore residue is significantly increased. Preferably, the concentration of the aqueous metal ore residue is increased from 10 to 40% by weight or from 20 to 40% by weight or from 10 to 50% by weight or from 20 to 50% by weight. Also preferably, the concentration of the aqueous metal ore residue is increased from 10 to 70% by weight or from 20 to 70% by weight or from 10 to 60% by weight or from 20 to 60% by weight.

Preferably according to the invention, the polymer (P) is added:

before a step of pumping the aqueous metal ore residue, in particular using a pump chosen among a centrifugal pump, a peristaltic pump, a positive displacement pump, a water pump, a compressed air pump, a diaphragm pump, a rotary pump; or during a step of pumping the aqueous metal ore residue, in particular using a centrifugal pump or a positive displacement pump; or after a step of pumping the aqueous metal ore residue, in particular using a centrifugal pump or a positive displacement pump; or after a step of concentration of the aqueous metal ore residue, for example using at least one device chosen among a thickener, a high-density thickener or by densimetric concentration or by gravimetric concentration; or before a step of conveying the aqueous metal ore residue, in particular conveying using an open pipe, a closed pipe or a pipeline;

before a step of storing the aqueous metal ore residue;

during a step of storing the aqueous metal ore residue.

More preferably according to the invention, the polymer (P) is added:

before a step of pumping the aqueous metal ore residue, in particular using a pump chosen among a centrifugal pump, a peristaltic pump, a positive displacement pump; or after a step of pumping the aqueous metal ore residue, in particular using a centrifugal pump, a peristaltic pump, a positive displacement pump; or after a step of concentration of the aqueous metal ore residue, for example using at least one device chosen among a thickener, a high-density thickener or by densimetric concentration or by gravimetric concentration; or before a step of conveying the aqueous metal ore residue, in particular conveying using a closed pipe or a pipeline;

before a step of storing the aqueous metal ore residue.

Preferably, the polymer (P) used according to the invention has a molecular mass Mw, measured by GPC, ranging from 200,000 g/mol to $2.5 \cdot 10^6$ g/mol, more preferentially ranging from 250,000 g/mol to $2.2 \cdot 10^6$ g/mol or from 400,000 g/mol to $2.2 \cdot 10^6$ g/mol. The polymer (P) used according to the invention is therefore not a flocculating agent. According to the invention, the molecular mass Mw of the copolymers is determined by Gel Permeation Chromatography (GPC). This technique uses a Waters liquid chromatography apparatus equipped with a Waters refractive index detector. This liquid chromatography apparatus is equipped with a size exclusion column in order to separate the various molecular weights of the copolymers studied:

Waters 515 isocratic pump,
Waters 717 Plus automatic sampler,
oven for 4 columns, temperature controlled by the Waters 2414 RI (refractive index) detector,
protection column: Agilent PLgel, 20 µm, MiniMIX-A, 50 mm long and 4.6 mm in internal diameter,
analytical columns: a 20 µm Agilent PLgel, MiniMIX-A, 250 mm long and 4.6 mm in diameter, and a 10 µm Agilent PLgel, MiniMIX-B, 250 mm long and 4.6 mm in internal diameter,
computer and Con Senxus hs NTeqGPC software V 5.1.5, 0.2 µm porosity syringe filters.

The analytical products used are tetrahydrofuran for HPLC and a set of poly(methyl methacrylate) standards supplied by Agilent (Polymer Lab), EasiVial PMMA (4 mL), part number PL2020-0200, molecular weight range: 500 to $1.5 \cdot 10^6$ g/mol (Mpeak). The analysis parameters are:

1/ mobile phase: inhibitor-free tetrahydrofuran (HPLC grade),
2/ standby flow rate of 0.1 mL/min and in-analysis flow of 0.3 mL/min,
3/ 35° C. oven column temperatures and 35° C. internal temperature for the RI detector,
4/ 5 mg/mL of pre-injection samples of polymer solid in mobile phase,
5/ 100 µL injection volume per loop per autosampler,
6/ 30 min analysis time,
7/ calibration according to steps:
analysis of the standard set,
internal standard correction (negative water peak) and Vp measure for each analysis, (Vp=peak retention volume),
calculation of the narrow reference calibration curve (molecular weight Mw relative to the retention volume), with choice of best fitting curve.

The method according to the invention uses at least one particular polymer (P), in particular a polymer (P1) or polymer (P2), prepared by radical polymerisation reaction at a temperature ranging from 50° C. to 98° C., preferably from 50° C. to 95° C. or from 50° C. to 85° C. A higher temperature, particularly above 100° C., may be used by adjusting the pressure of the reaction medium to prevent evaporation.

Preferably according to the invention, the polymer (P) can be prepared by at least one radical emulsion polymerisation reaction or by at least one radical reverse emulsion polymerisation reaction. During the radical polymerisation reaction, one or more surface-active compounds may be used, especially one or more non-ionic surface-active compounds.

According to the invention, the polymer (P1) is prepared in direct emulsion from:

(a) at least one anionic monomer comprising at least one polymerisable olefinic unsaturation and at least one carboxylic acid group;
(b) at least one ester of an acid chosen among acrylic acid, methacrylic acid;
in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof. Preferably, this polymerisation reaction does not use benzoyl peroxide.

Preferably according to the invention, the polymer (P1) is prepared in water, alone or in combination with an organic solvent. More preferably according to the invention, the polymer (P1) is prepared in water alone.

According to the invention, the polymer (P2) is prepared in reverse emulsion from:

(a) at least one anionic monomer comprising at least one polymerisable olefinic unsaturation and at least one carboxylic acid group or one of its salts;
(c) at least one compound chosen among acrylamide, an acrylamide derivative, a salt of an acrylamide derivative and combinations thereof;
in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof.

Preferably according to the invention, the polymer (P2) is prepared in an organic solvent, preferably in a hydrocarbon solvent, particularly a hydrocarbon petroleum fraction.

Advantageously according to the invention, the polymer (P2) is completely or partially neutralised, in particular at the end of the polymerisation reaction.

The polymer (P2) according to the invention can be neutralised, in particular during the polymerisation reaction or at the end of the polymerisation reaction. The polymer according to the invention can be completely or partially neutralised. According to the invention, the neutralisation of the polymer is carried out by neutralising or salifying all or part of the carboxylic acid groups present in the polymer.

Preferably, this neutralisation is carried out using a base, for example using a derivative of an alkaline metal or a derivative of an alkaline-earth metal. The preferred bases are chosen among NaOH, KOH, $NH_4OH$, monoisopropylamine, triethanolamine, triisopropylamine, 2-amino-2-methyl-1-propanol (AMP), triethylamine, diethylamine, monoethylamine. Particularly preferably, neutralisation is carried out using NaOH, KOH, $NH_4OH$, alone or in combination.

According to the invention, the polymerisation reaction uses at least one anionic monomer (a) comprising at least one polymerisable olefinic unsaturation and at least one carboxylic acid group or one of its salts. Preferably, the anionic monomer (a) comprising at least one polymerisable olefinic unsaturation comprises one or two carboxylic acid groups, particularly a single carboxylic acid group. More preferentially, it is chosen among acrylic acid, methacrylic acid, an acrylic acid salt, a methacrylic acid salt and mixtures thereof, much more preferentially acrylic acid.

When preparing polymer (P1), the preferred monomer (a) is methacrylic acid. When preparing polymer (P2), the preferred monomer (a) is acrylic acid.

In addition to monomers (a) and (b) or (c), the polymer preparation reaction (P) can also use one or several other monomers. Preferably, the polymerisation reaction can then also use at least one monomer chosen among:

(d) at least one compound chosen among 2-acrylamido-2-methylpropane sulphonic acid, 2-sulphoethyl methacrylate, sodium methallyl sulphonate, styrene sulphonate, their salts and combinations thereof or
(e) at least one compound of formula (I):

$$R^1\text{—}(EO)_m\text{—}(PO)_n\text{—}R^2 \quad (I)$$

wherein:
m and n, identical or different, independently represent 0 or an integer or decimal less than 150, m or n is different from 0,
EO represents a $CH_2CH_2O$ group,
PO independently represents a group chosen among $CH(CH_3)CH_2O$ and $CH_2CH(CH_3)O$,
$R^1$ represents a group comprising at least one polymerisable olefinic unsaturation, preferably a group selected among acrylate, methacrylate, acryl urethane, methacryl urethane, vinyl, allyl, methallyl and isoprenyl, more preferentially a methacrylate group,
$R^2$ represents a straight, branched or cyclical, saturated, unsaturated or aromatic hydrocarbon group comprising from 6 to 40 carbon atoms, preferably a straight or branched $C_6$-$C_{40}$ alkyl group, preferably a straight or branched
$C_8$-$C_{30}$ alkyl group, a $C_6$-$C_{40}$ aryl group, preferably a $C_8$-$C_{30}$ aryl group such as a tristyryl phenyl group; or (f) at least one monomer selected among:
polyalkylene glycol acrylate, preferably polyethylene glycol acrylate or polyethylene-polypropylene glycol acrylate,
polyalkylene glycol methacrylate, preferably polyethylene glycol methacrylate or polyethylene polypropylene glycol methacrylate,
allyl polyalkylene glycol, preferably allyl polyethylene glycol or allyl polyethylene-polypropylene glycol,
methallyl polyalkylene glycol, preferably methallyl polyethylene glycol or methallyl polyethylene polypropylene glycol,
3-methyl-3-buten-1-ylpolyalkylene glycol, preferably 3-methyl-3-buten-1-ylpolyethylene glycol or 3-methyl-3-buten-1-ylpolyethylene polypropylene glycol; or (g) at least one cross-linking monomer or at least one monomer comprising at least two olefinic unsaturations.

Preferably, the polymer (P) used according to the invention is a non-sulphonated polymer.

The method of preparation according to the invention makes it possible to prepare a suspension of aqueous metal ore residue comprising at least one polymer (P) that has particularly advantageous properties, in particular rheological properties that are particularly advantageous.

Thus, the invention also provides an aqueous mineral suspension with a dry solids content that is greater than 40% by weight of the suspension and having at least one property chosen among:
a Brookfield viscosity, measured at 100 rpm and at 25° C., greater than 2,000 mPa·s;
a flow threshold measured at a temperature of 25° C. using a rheometer with imposed shearing, equipped with a bladed spindle, for a particular torsional loading, greater than 40 Pa; and
a Brookfield viscosity, measured at 100 rpm and at 25° C., greater than 2,000 mPa·s and a flow threshold, measured at a temperature of 25° C. using a rheometer with imposed shearing, equipped with a bladed spindle, for a particular torsional loading, greater than 40 Pa;

comprising an aqueous metal ore residue and at least one polymer (P) with a molecular mass Mw, measured by GPC, ranging from 100,000 to $3.10^6$ g/mol and prepared by at least one radical polymerisation reaction at a temperature greater than 50° C., and chosen among:

a polymer (P1) prepared in direct emulsion from:
(a) at least one anionic monomer comprising at least one polymerisable olefinic unsaturation and at least one carboxylic acid group;
(b) at least one ester of an acid chosen among acrylic acid, methacrylic acid;
in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof;

a polymer (P2) prepared in reverse emulsion from:
(a) at least one anionic monomer comprising at least one polymerisable olefinic unsaturation and at least one carboxylic acid group or one of its salts;
(c) at least one compound chosen among acrylamide, an acrylamide derivative, a salt of an acrylamide derivative and combinations thereof;
in the presence of at least one radical-generating compound chosen among ammonium persulphate, an alkaline metal persulphate and combinations thereof or their respective combinations with an ion chosen among $Fe^{II}$, $Fe^{III}$, $Cu^{I}$, $Cu^{II}$ and mixtures thereof.

The particular, advantageous or preferred characteristics of the method according to the invention define suspensions according to the invention which are also particular, advantageous or preferred.

The following examples illustrate the various aspects of the invention.

The polymers used in the method according to the invention are prepared.

Polymer (P1A) is prepared by placing 420 g of deionised water and 2.15 g of sodium dodecyl sulphate into a one-litre glass reactor with mechanical stirring and oil bath heating.

In a 600 mL beaker with a dosing pump and magnetic stirring, a pre-emulsion is prepared comprising:
205 g of deionised water,
1.85 g of sodium dodecyl sulphate,
164 g of ethyl acrylate,
132 g of methacrylic acid,
6 g of divinyl benzene,
4.8 g ethylene glycol dimethacrylate.

0.26 g of ammonium persulphate dissolved in 5 mL of deionised water is weighed into a 10 mL beaker, as initiator 1.

0.2 g of ammonium persulphate diluted in 20 g of water is weighed into a 20 mL test tube fitted with a dosing pump, as initiator 2.

The reactor is heated to 85° C. and initiator 1 is injected. Then, over 2.5 hours, the pre-emulsion is injected into the reactor which is kept at 85° C. Initiator 2 is injected in parallel into the reactor during the polymerisation step and concomitantly with the addition of the pre-emulsion Heating is continued for 1 hour at 85° C. Then, the reaction medium is treated while warm for 30 minutes with a solution of 0.3 g of persulphate in 10 g of water.

Lastly, the pumps are rinsed with water.

The medium is heated again for 60 min at 80° C.

A polymer dispersion (P1A) is obtained with a molecular mass Mw, measured by GPC, of $2.10^6$ g/mol at 30% by weight of solids content and a pH of 2.8.

Polymer (P1B) is prepared by placing 420 g of deionised water and 4.1 g of sodium dodecyl sulphate into a one-litre glass reactor with mechanical stirring and oil bath heating.

In a 600 mL beaker with a dosing pump and magnetic stirring, a pre-emulsion is prepared comprising:

170 g of deionised water,
2 g of sodium dodecyl sulphate,
159 g of ethyl acrylate,
107 g of methacrylic acid,
19 g of 2-tetradecyl octadecanol methacrylate oxyethylated 25 times.

0.9 g of ammonium persulphate dissolved in 5 mL of deionised water is weighed into a 10 mL beaker, as initiator 1.

0.09 g of sodium metabisulphite in 5 g of water is weighed into a 20 mL test tube fitted with a dosing pump, as initiator 2.

The reactor is heated to 75° C. and initiator 1 and initiator 2 are injected. Then, over 2 hours, the pre-emulsion is injected into the reactor which is kept at 75° C.

Heating is continued for 1 hour at 85° C. Then, the reaction medium is treated while warm for 30 minutes with a solution of 0.3 g of persulphate in 10 g of water.

Lastly, the pumps are rinsed with water.

The medium is heated again for 60 min at 80° C.

A polymer dispersion (P1B) is obtained with a molecular mass Mw, measured by GPC, of 500,000 g/mol at 30% by weight of solids content and a pH of 3.0.

The raw material used for this series of tests is an aqueous metal ore residue from a Chilean copper mine located in the north of the country. This is waste resulting from the separation of the ore containing the useable metal from the rock extracted from the mine. This aqueous copper ore residue is in the form of a water-based suspension.

The samples used for these tests were collected at the outlet of a conventional thickener used to concentrate the aqueous metal ore residue before it is deposited in a storage pond. The first sample is taken just after a peristaltic pump, the second sample after a centrifugal pump.

Various measurements were taken beforehand on the aqueous residue in the absence of the polymer according to the invention:
  particle size distribution using a Mastersizer 2000 laser granulometer (Malvern),
  solid content using a Mettler-Toledo dry balance,
  Brookfield viscosity at 100 rpm using a Brookfield DV3T viscometer with a suitable spindle,
  flow limit value using a Brookfield DV3T viscosity meter with a bladed spindle.

The particle size distribution by volume shows the presence of multiple particle populations with different sizes:
  point (A) at the peristaltic pump outlet located after a conventional thickener in the copper ore residue processing facility: D(0.1)=1.2 µm, D(0.5)=22.1 µm, D(0.9)=139 µm,
  point (B) at the centrifugal pump outlet located after a conventional thickener in the copper ore residue processing facility: D(0.1)=1.1 µm, D(0.5)=22.3 µm, D(0.9)=147 µm.

The other characteristics of the polymer-free copper ore residue are shown in Table 1.

TABLE 1

|  | Point (A) | Point (B) |
|---|---|---|
| % Solids content | 62.8 | 60.4 |
| pH | 8.3 | 8.3 |
| Conductivity in µS/cm | 1,630 | 1,729 |
| Brookfield viscosity at 100 rpm, in mPa · s | 925 | 560 |
| Flow limit in Pa | 25 | 13 |

Thickening tests are then performed on aqueous residue samples from points (A) and (B).

A sample of suspension of aqueous copper ore residue is transferred into a 500 mL beaker and then mechanically stirred with a Raynerie mixer. Stirring varies from 800 to 1,000 rpm.

Then polymers (P1A) or (P1B) according to the invention are added and left to stir for 5 to 10 min.

Stirring is then stopped to measure the Brookfield viscosity at 100 rpm and the flow limit value.

The test is repeated, adding different amounts of polymer of 0.05%, 0.1%, and 0.15% by dry/dry weight, relative to the suspension. The results are shown in Table 2.

TABLE 2

|  | Point (A) | | Point (B) | |
|---|---|---|---|---|
| Dosing in % dry/dry - Polymer | (P1A) | (P1B) | (P1A) | (P1B) |
| Brookfield viscosity at 100 rpm, in mPa · s | | | | |
| 0.05 | 1,256 | 1,090 | 600 | 650 |
| 0.1 | 1,460 | 1,470 | 880 | 830 |
| 0.15 | 2,050 | 1,970 | 1,100 | 1,250 |
| Flow limit in Pa | | | | |
| 0.05 | 27 | 39 | 23 | 19 |
| 0.1 | 42 | 53 | 37 | 35 |
| 0.15 | 85 | 70 | 54 | 48 |

Another series of tests is conducted on other samples of aqueous copper ore residue with solids contents of 50% and 61%. A similar protocol is implemented with polymer (P1A) and (P1B) at doses of 0.05% and of 0.1% by dry/dry weight.

The flow limits are measured immediately after adding polymers (P1A) or (P1B) (T0), then after one hour (T1), after two hours (T2), and finally after 24 hours (T24). The results are shown in Table 3.

TABLE 3

|  | T0 | | T1 | | T2 | | T24 | |
|---|---|---|---|---|---|---|---|---|
| Polymer | (P1A) | (P1B) | (P1A) | (P1B) | (P1A) | (P1B) | (P1A) | (P1B) |
| Flow limit in Pa at 61% solids content | | | | | | | | |
| Point (A) - 0.05% | 14 | 22 | 22 | 26 | 23 | 43 | 96 | 136 |
| Point (B) - 0.05% | 48 | 26 | 69 | 28 | 74 | 35 | 144 | 101 |
| Point (A) - 0.01% | 51 | 42 | 51 | 54 | 66 | 82 | 156 | 142 |
| Point (B) - 0.01% | 47 | 48 | 50 | 50 | 52 | 62 | 136 | 140 |
| Flow limit in Pa at 50% solids content | | | | | | | | |
| Point (A) - 0.1% | 9 | 9 | 22 | 16 | 30 | 38 | 126 | 116 |
| Point (B) - 0.1% | 20 | 16 | 55 | 44 | 60 | 90 | 244 | 136 |

In the absence of polymer, it was found that the aqueous suspensions of copper ore residue have low viscosities that disrupt their storage in ponds and can present uncontrolled flow hazards.

The addition of polymers (P1A) or (P1B) according to the invention makes it possible to significantly increase these viscosities as well as to control the flow threshold of these suspensions.

With the polymers according to the invention, it is therefore possible to thicken aqueous copper ore residues, in particular at a thickener outlet, while controlling their rheology.

These residues can then be stored more efficiently and safely in ponds, in particular by stacking up successive layers of thickened residue. Stacking residue up in successive layers with an appropriate slope makes it possible to increase the useful life of the storage ponds which usually have limited surface areas.

The invention claimed is:

1. A method for preparing an aqueous mineral suspension, the method comprising:
adding, in an aqueous metal ore residue, a first component comprising a polymer (P) with a molecular mass Mw, measured by GPC, in a range of from 100,000 to $3 \cdot 10^6$ g/mol and prepared by a method comprising radical polymerization at a temperature greater than 50° C., the polymer (P) comprising:
a polymer (P1) prepared in direct emulsion from reagents comprising (a) an anionic monomer comprising a polymerizable olefinic unsaturation and a carboxylic acid group; and (b) an ester of acrylic acid and/or methacrylic acid, in the presence of a radical-generating compound comprising ammonium persulfate and/or an alkaline metal persulfate and optionally further an $Fe^{II}$, $Fe^{III}$, $Cu^{I}$, and/or $Cu^{II}$ ion; and/or
a polymer (P2) prepared in reverse emulsion from reagents comprising: (a) an anionic monomer comprising a polymerizable olefinic unsaturation and a carboxylic acid group, optionally as a salt; and (c) acrylamide, an acrylamide derivative, and/or a salt of an acrylamide derivative, in the presence of a radical-generating compound comprising ammonium persulfate and/or an alkaline metal persulfate and optionally further an comprising $Fe^{II}$, $Fe^{III}$, $Cu^{I}$, and/or $Cu^{II}$ ion,
wherein the aqueous mineral suspension produced has (i) a dry solids content greater than 40 wt. % of the suspension, and
(ii-a) a Brookfield viscosity, measured at 100 rpm and at 25° C., greater than 2,000 mPa·s; and/or
(ii-b) a flow threshold measured at a temperature of 25° C. using a rheometer with imposed shearing, equipped with a bladed spindle, for a particular torsional loading, greater than 40 Pa.

2. The method of claim 1, wherein the Brookfield viscosity of the suspension is in a range of from greater than 2,500 to less than 10,000 mPa·s.

3. The method of claim 1, wherein the flow threshold of the suspension is in a range of from greater than 80 to less than 700 Pa.

4. The method of claim 1, wherein the suspension has a dry solids content greater than 50 wt. %.

5. The method of claim 1, wherein the suspension comprises from 0.01 to 2 dry wt. % of the polymer (P), relative to a dry weight of the ore residue.

6. The method of claim 1, comprising:
adding two different polymers (P) or further adding a compound comprising a natural thickening polymer derivative, synthetic thickening polymer derivative, mineral thickening polymer derivative, organic thickening polymer derivative, a mineral thickener, and/or a polysaccharide.

7. The method of claim 1, wherein the metal ore comprises lithium, strontium, lanthanide, actinide, uranium, rare earth, titanium, zirconium, vanadium, niobium, chromium, molybdenum, tungsten, manganese, iron, cobalt, rhodium, iridium, nickel, palladium, platinum, copper, silver, gold, zinc, cadmium, tin, and/or lead, or
wherein the metal ore comprises a metal oxide, a metal sulfide, or a metal carbonate; or
wherein the metal ore residue comprises a residual amount of metal of less than 2,000 dry g per dry ton of metal ore residue.

8. The method of claim 1, wherein the polymer (P) is added before pumping the aqueous metal ore residue.

9. The method of claim 1, wherein the polymerization is carried out at a temperature in a range of from 50 to 98° C.; or
wherein the polymer (P1) is prepared in water, alone or in combination with an organic solvent; or
wherein the polymer (P2) is prepared without solvent or in an organic solvent; or
wherein the polymer (P) has a molecular mass Mw, measured by GPC, in a range of from 200,000 g/mol to $2.5 \cdot 10^6$ g/mol; or
wherein the polymer (P2) is completely or partially neutralized.

10. The method of claim 1, wherein the anionic monomer comprises a polymerizable olefinic unsaturation and has one or two carboxylic acid groups.

11. The method of claim 1, wherein the polymerization further comprises polymerizing another monomer comprising:
(d) 2-acrylamido-2-methylpropane sulfonic acid, 2-sulfoethyl methacrylate, sodium methallyl sulfonate, and/or styrene sulfonate, optionally as a salt, or
(e) a compound of formula (I):

$$R^1-(CH_2CH_2O)_m-(PO)_n-R^2 \quad (I),$$

wherein
m and n are independently 0 or an integer or decimal less than 150, and m or n is different from 0,
PO is independently $CH(CH_3)CH_2O$ or $CH_2CH(CH_3)O$,
$R^1$ is a group comprising a polymerizable olefinic unsaturation,
$R^2$ is a hydrocarbon group comprising 6 to 40 carbon atoms; or
(f) a monomer comprising polyalkylene glycol acrylate, polyalkylene glycol methacrylate, allyl polyalkylene glycol, methallyl polyalkylene glycol, and/or 3-methyl-3-buten-1-ylpolyalkylene glycol; or
(g) a cross-linking monomer or a monomer comprising a first and a second olefinic unsaturation.

12. The method of claim 1, further comprising:
adding a second component comprising an alginate, guar gum, xanthan gum, cellulose derivative, starch, bentonite, laponite, and/or clay.

13. The method of claim 1, wherein the polymer (P) is added during pumping the aqueous metal ore residue.

14. The method of claim 1, wherein the polymer (P) is added after pumping the aqueous metal ore residue.

15. The method of claim 1, wherein the polymer (P) is added after concentrating the aqueous metal ore residue.

16. The method of claim 1, wherein the polymer (P) is added before conveying the aqueous metal ore residue.

17. The method of claim 1, wherein the polymer (P) is added before storing the aqueous metal ore residue.

18. The method of claim 1, wherein the polymer (P) is added during storing the aqueous metal ore residue.

19. The method of claim 1, wherein the Brookfield viscosity of the suspension is in a range of from greater than 3,000 mPa·s to 8,000 mPa·s.

20. The method of claim 1, wherein the Brookfield viscosity of the suspension is in a range of from greater than 4,000 mPa·s to 7,000 mPa·s.

* * * * *